United States Patent
Song et al.

(10) Patent No.: US 12,347,432 B2
(45) Date of Patent: Jul. 1, 2025

(54) SPEECH SKILL JUMPING METHOD FOR MAN MACHINE DIALOGUE, ELECTRONIC DEVICE AND STORAGE MEDIUM

(71) Applicant: AI SPEECH CO., LTD., Suzhou (CN)

(72) Inventors: Hongbo Song, Suzhou (CN); Shuai Fan, Suzhou (CN); Chun Li, Suzhou (CN)

(73) Assignee: AI SPEECH CO., LTD., Suzhou (CN)

( * ) Notice: Subject to any disclaimer, the term of this patent is extended or adjusted under 35 U.S.C. 154(b) by 328 days.

(21) Appl. No.: 17/918,673

(22) PCT Filed: Oct. 21, 2020

(86) PCT No.: PCT/CN2020/122477
§ 371 (c)(1),
(2) Date: Oct. 13, 2022

(87) PCT Pub. No.: WO2021/208392
PCT Pub. Date: Oct. 21, 2021

(65) Prior Publication Data
US 2023/0352012 A1 Nov. 2, 2023

(30) Foreign Application Priority Data
Apr. 15, 2020 (CN) .......................... 202010296180.8

(51) Int. Cl.
*G10L 15/22* (2006.01)
*G10L 15/06* (2013.01)

(52) U.S. Cl.
CPC ............ *G10L 15/22* (2013.01); *G10L 15/063* (2013.01); *G10L 2015/0638* (2013.01); *G10L 2015/223* (2013.01)

(58) Field of Classification Search
CPC ................... G10L 15/22; G10L 15/063; G10L 2015/0638; G10L 2015/223;
(Continued)

(56) References Cited

U.S. PATENT DOCUMENTS

| 10,600,406 B1* | 3/2020 | Shapiro .................. G10L 15/22 |
| 2015/0254057 A1* | 9/2015 | Klein .................. H04N 21/4668 704/275 |

(Continued)

FOREIGN PATENT DOCUMENTS

| CN | 105845137 A * | 8/2016 |
| CN | 107967261 A | 4/2018 |

(Continued)

OTHER PUBLICATIONS

Foreign Communication from Related Application—First Chinese Office Action with English Translation regarding Chinese Patent Application No. 202010296180.8, dated Feb. 5, 2021, 14 pages.

(Continued)

*Primary Examiner* — Douglas Godbold
(74) *Attorney, Agent, or Firm* — Conley Rose, P.C.; Rodney B. Carroll

(57) ABSTRACT

Disclosed is a speech skill jumping method for man-machine dialogue, comprising constructing a field migration map in advance based on user's historical man-machine dialogue data; receiving external speech; determining a dialogue field that the external speech hits; and judging whether the hit dialogue field belongs to one of the plurality of dialogue fields in the field migration map, and ignoring the external speech if not, or jumping to a speech skill corresponding to the hit dialogue field if yes. A field migration map is generated based on a user's historical man-machine dialogue data which reflects the user's interaction habits, and whether to perform a speech skill jump is judged based on the field migration map, obviously abnormal input content can be shielded, improving the task completion and interaction efficiency.

8 Claims, 4 Drawing Sheets

(58) Field of Classification Search
CPC . G10L 2015/228; G06F 40/279; G06F 40/35; G06F 3/167
See application file for complete search history.

(56) References Cited

U.S. PATENT DOCUMENTS

| | | | | |
|---|---|---|---|---|
| 2015/0332168 | A1* | 11/2015 | Bhagwat | G06F 3/0481 |
| | | | | 706/12 |
| 2018/0004729 | A1* | 1/2018 | Qiu | G06F 40/205 |
| 2019/0080685 | A1* | 3/2019 | Johnson, Jr. | G06Q 30/0256 |
| 2019/0103103 | A1* | 4/2019 | Ni | G10L 15/1822 |
| 2019/0198019 | A1* | 6/2019 | Xu | G10L 17/22 |
| 2019/0205379 | A1* | 7/2019 | Takiel | G06F 16/3329 |
| 2021/0224066 | A1* | 7/2021 | Iwase | G06F 3/167 |
| 2021/0295836 | A1* | 9/2021 | Iwase | G10L 15/22 |
| 2021/0304756 | A1* | 9/2021 | Iwase | G10L 15/22 |
| 2022/0350605 | A1* | 11/2022 | Iwase | G06F 3/011 |

FOREIGN PATENT DOCUMENTS

| | | | |
|---|---|---|---|
| CN | 109086329 | A * | 12/2018 |
| CN | 109710129 | A | 5/2019 |
| CN | 109815319 | A | 5/2019 |
| CN | 110223692 | A | 9/2019 |
| CN | 110473537 | A | 11/2019 |
| CN | 110570853 | A | 12/2019 |
| CN | 110674338 | A | 1/2020 |
| CN | 111506292 | A | 8/2020 |
| JP | 2007079397 | A | 3/2007 |
| JP | 2018081444 | A | 5/2018 |
| WO | 2019235190 | A1 | 12/2019 |
| WO | 2021208392 | A1 | 10/2020 |

OTHER PUBLICATIONS

Foreign Communication from Related Application—International Search Report and Written Opinion of the International Searching Authority, International Application No. PCT/CN2020/122477, dated Jan. 22, 2021, 10 pages.

Foreign Communication from Related Application—First Chinese Search Report, Chinese Patent Application No. 202010296180.8, dated Feb. 5, 2021, 14 pages.

Foreign Communication from Related Application—Supplementary Chinese Search Report, Chinese Patent Application No. 202010296180.8, dated Feb. 5, 2021, 14 pages.

Foreign Communication from Related Application—Notice of Reasons for Refusal, Japanese Patent Application No. 2022-562335, dated Mar. 2023, 3 pages.

Foreign Communication from Related Application—Communication pursuant to Article 94(3) EPC, European Application No. 20931185.1, dated Aug. 7, 2024, 5 pages.

Foreign Communication from Related Application—European Search Report , European Application No. 20931185.1, dated Jan. 9, 2023, 11 pages.

* cited by examiner

1

SPEECH SKILL JUMPING METHOD FOR MAN MACHINE DIALOGUE, ELECTRONIC DEVICE AND STORAGE MEDIUM

This application is a filing under 35 U.S.C. 371 of International Application No. PCT/CN2020/122477, filed Oct. 21, 2020, which claims the benefit of Chinese Patent Application No. 202010296180.8, filed on Apr. 15, 2020, the entirety of the contents of both applications being incorporated herein by reference.

TECHNICAL FIELD

The present invention relates to the technical field of artificial intelligence, and in particular, to a speech skill jumping method for man-machine dialogue, an electronic device and a storage medium.

BACKGROUND

There are two kinds of skill scheduling strategies in the existing man-machine dialogue, including a rule-based task-based dialogue field scheduling strategy and a rule-based field jumping strategy.

In the rule-based task-based dialogue field scheduling strategy, if an input content is ambiguous when a user interacts with a dialogue system, it will hit a plurality of semantic fields (e.g., "Jay Chou" said by the use may hit the music and encyclopedia fields). In the rule-based scheduling strategy, the final semantic field is determined in a configured order (e.g., if the music field is ranked in the front of the configuration table, the music field is selected). The disadvantage is that the configured order in the rule may not be proper, or may be correct only for some users.

In the rule-based field jump strategy, for a multi-round dialogue skill such as that in navigation field, when a jump switch is turned off, jumping out from the current skill is not available until the slot is filled according to the rule-based manner; or when the jump switch is turned on, noise input may lead to a decision on whether to jump out of the current field.

The disadvantage is that if the field jump switch is turned off, the user cannot switch fields, which is obviously inconvenient; and if the field jump switch is turned on, it is liable to cause misidentification due to noise and human voices all around, which affects the dialogue process. For example, in the navigation skill, the user has already selected the starting point and destination to start navigation. Jumping out from the navigation skill may incur due to the word "weather" unintentionally entered by noise, which causes loss of the dialogue context and the slot filling interaction of the navigation skill needs to be performed again.

SUMMARY OF THE INVENTION

Embodiments of the present invention provide a speech skill jumping method for man-machine dialogue, an electronic device, and a storage medium, so as to solve at least one of the above technical problems.

In a first aspect, an embodiment of the present invention provides a speech skill jumping method for man-machine dialogue, which is applied to an electronic device, and the method includes:
  constructing a field migration map in advance based on a user's historical man-machine dialogue data, the field migration map being a directed map comprising a plurality of dialogue fields;
  receiving an external speech;
  determining a dialogue field that the external speech hits; and
  judging whether the hit dialogue field belongs to one of the plurality of dialogue fields in the field migration map, and ignoring the external speech if not, or jumping to a speech skill corresponding to the hit dialogue field if yes.

In a second aspect, an embodiment of the present invention provides a storage medium that stores one or more programs including execution instructions, in which the execution instructions can be read and executed by an electronic device (including but not limited to a computer, a server, or a network device, etc.), so as to perform any of the above speech skill jumping method for man-machine dialogue according to the present invention.

In a third aspect, an electronic device is provided, including at least one processor and a memory communicatively coupled to the at least one processor, in which the memory stores instructions executable by the at least one processor, and the instructions are executed by the at least one processor to enable the at least one processor to perform the speech skill jumping method for man-machine dialogue according to the present invention.

In a fourth aspect, an embodiment of the present invention also provides a computer program product including a computer program stored in a storage medium, in which the computer program includes program instructions which, when being executed by a computer, enables the computer to perform any of the above speech skill jumping method for man-machine dialogue.

The embodiments of the present invention have the following beneficial effects. A field migration map is generated based on a user's historical man-machine dialogue data, and whether to perform a speech skill jump is judged based on the field migration map. Since the historical man-machine dialogue data reflects the user's interaction habits, obviously abnormal input content (such as noise beyond the user's habits) can be shielded through combination with the field migration map, improving the task completion and interaction efficiency.

BRIEF DESCRIPTION OF THE DRAWINGS

In order to illustrate the technical solutions of the embodiments of the present disclosure more clearly, a brief description of the accompanying drawings used in the description of the embodiments will be given as follows. Obviously, the accompanying drawings are some embodiments of the present disclosure, and those skilled in the art can also obtain other drawings based on these drawings without any creative effort.

DETAILED DESCRIPTION OF THE EMBODIMENTS

Figure 1:
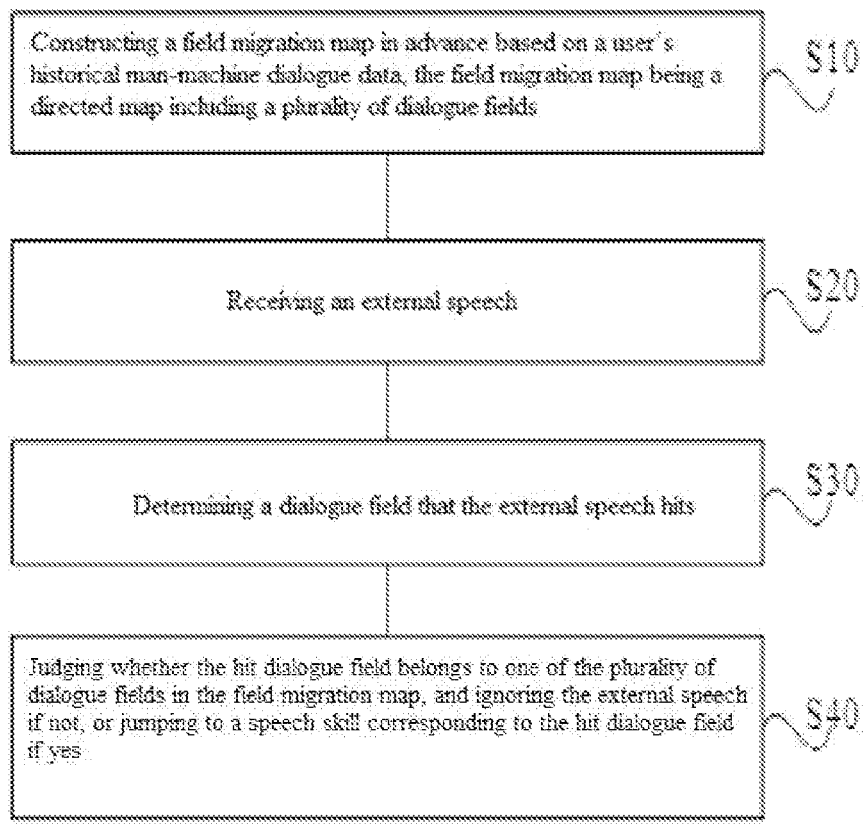
FIG. 1 is a flowchart of a speech skill jumping method for man-machine dialogue according to an embodiment of the present invention.

In order to further clarify the objectives, technical solutions and advantages of the embodiments of the present disclosure, the technical solutions in the embodiments of the present disclosure will be described clearly and completely below with reference to the accompanying drawings in the embodiments of the present disclosure. Obviously, only some but not all embodiments of the present disclosure have been described. All other embodiments obtained by those skilled in the art based on these embodiments without creative efforts shall fall within the protection scope of the present disclosure.

It should be noted that the embodiments in the present application and the features in these embodiments can be combined with each other when no conflict exists.

The present application can be described in the general context of computer-executable instructions such as program modules executed by a computer. Generally, program modules include routines, programs, objects, elements, and data structures, etc. that performs specific tasks or implement specific abstract data types. The present application can also be practiced in distributed computing environments in which tasks are performed by remote processing devices connected through a communication network. In a distributed computing environment, program modules may be located in local and remote computer storage media including storage devices.

In the present application, "module", "system", etc. refer to related entities applied in a computer, such as hardware, a combination of hardware and software, software or software under execution, etc. In particular, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also conduct communication through local and/or remote process based on signals comprising one or more data packets, for example, a signal from data that interacts with another element in a local system or a distributed system, and/or a signal from data that interacts with other systems through signals in a network of the internet.

Finally, it should also be noted that, wordings like first and second are merely for separating one entity or operation from the other, but not intended to require or imply a relation or sequence among these entities or operations. Further, it should be noted that in this specification, terms such as "comprised of" and "comprising" shall mean that not only those elements described thereafter, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

As shown in FIG. 1, an embodiment of the present invention provides a speech skill jumping method for man-machine dialogue, which is applied to an electronic device. The electronic device may be any electronic device with a man-machine voice interaction function, such as a smart speaker, an on-board machine, a smart TV, a smart phone, a tablet computer, and a smart watch, which is not limited in the present invention. The method includes the following steps.

In S10, the electronic device constructs a field migration map in advance based on a user's historical man-machine dialogue data, the field migration map being a directed map including a plurality of dialogue fields. The field migration map is used to predict a next field based on a current field state, and output a confidence level of the predicted field.

In S20, the electronic device receives an external speech. In an exemplary embodiment, the electronic device collects the user's speech through a microphone.

In S30, the electronic device determines a dialogue field that the external speech hits.

In S40, the electronic device judges whether the hit dialogue field belongs to one of the plurality of dialogue fields in the field migration map. If not, the external speech is ignored, and if yes, a jumping is made to a speech skill corresponding to the hit dialogue field.

In this embodiment, a field migration map is generated based on a user's historical man-machine dialogue data, and whether to perform a speech skill jump is judged based on the field migration map. Since the historical man-machine dialogue data reflects a user's interaction habits, obviously abnormal input content (such as noise beyond the user's habits) can be successfully shielded through a combination with the field migration map, improving the task completion and interaction efficiency.

In some embodiments, an example of constructing the field migration map in step S10 is as follows: each time the user conducts a round of dialogue, the system will record the user's environment information, the user's interaction field, and the switching path of the interaction field until the end of the dialogue. The system records the flow of the interaction and generates a record.

For example, a user's interaction process is as follows, in which the user first awakens the machine;
   User: Navigate to the company;
   Machine: Find 2 routes for you, one with the shortest path and the other with the minimum time. Which one to choose?
   User: minimum time;
   Machine: Start navigation;
   User: I want to listen to a song;
   Machine: Start playing for you;
   User: Change a song;
   User: The weather in Suzhou tomorrow;
   Machine: It will be sunny in Suzhou tomorrow . . . ;
   User: Exit.

Figure 2:
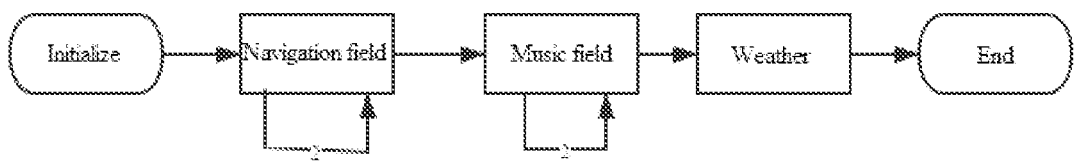
FIG. 2 is a schematic diagram of a field migration map in the present invention.

The above interaction process will generate a corresponding field migration map (see FIG. 2). The numbers on the arcs represent the number of interactions in the field, with 2 representing two rounds of interactions in the navigation field. The field migration map is a weighted directed map, which is regularly updated based on the user' online interaction data. With the accumulation of user usage data, combined with the user's environment information (e.g., the user who is interacting, the current time, location, scene, weather, etc.), a weighted field migration map can be formed. Paths with high weights may reflect the interaction habits of the user in a specific environment.

Here are two examples of scenes to solve problems:

Example 1: Through high-frequency user habits, wrong dialogue flows are reduced, and the interaction efficiency and task completion are improved.

User A drives from home to the company at 8:00 every morning, and awakens the on-board machine after getting in the car;

User A: Navigate to the company;

Machine: Find 2 routes for you, one with the shortest distance and the other with the minimum time. Which one to choose?

In this case, a radio voice on the vehicle was recognized: Jay Chou's song;

Machine: Play Jay Chou's song for you.

As in the above example, the surrounding irrelevant sound (Jay Chou's song) is recognized by the machine, and user A's multi-round interaction was interrupted thereby, which is not desirable. Through the field migration map, it is found that the user uses the navigation function around 8 o'clock every day, and the multi-round interaction of navigation will not migrate to other dialogue fields. If semantics in other fields (and the confidence level is not high) appear, this input is considered to be a mal-operation and is shielded by the system, thereby reducing erroneous input caused by noise.

Example 2: The user enters an incomplete sentence which causes ambiguity in field parsing. The field migration map can be used to disambiguate more accurately. User A's device is a smart speaker, and the most commonly used skill is music. In the field migration map, listening to music has a relatively high weight. After the user awakens the machine and says "Andy Lau" in the first round of interaction, both the music field and the encyclopedia field have return values and respective confidence levels. Through the field migration map, the user's habits can be learned, such that the user's intention can be correctly parsed.

In an exemplary embodiment, the field migration map includes a plurality of sub-field migration maps corresponding to a variety of different environment information, including at least one of current time, current location, current scene, and weather.

In some embodiments, the speech skill jumping method for man-machine dialogue further includes: acquiring, by the electronic device, current environment information; determining, by the electronic device, a matched sub-field migration map based on the current environment information; and when judging whether the hit dialogue field belongs to one of the plurality of dialogue fields in the field migration map, judging, by the electronic device, whether the hit dialogue field belongs to one of a plurality of dialogue fields in the matched sub-field migration map.

Figure 3:
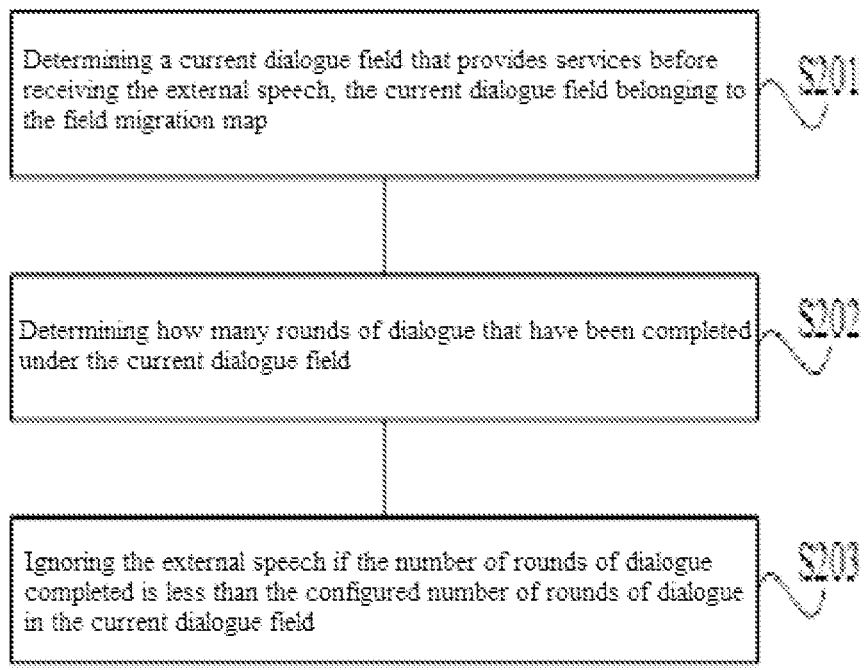
FIG. 3 is a flowchart of a speech skill jumping method for man-machine dialogue according to another embodiment of the present invention.

FIG. 3 is a flowchart of a speech skill jumping method for man-machine dialogue according to another embodiment of the present invention. In this embodiment, each of the plurality of dialogue fields in the field migration map is configured with a number of rounds of dialogue. The method according to the present embodiment shown in FIG. 3 further includes the following steps.

In S201, the electronic device determines a current dialogue field that provides services before receiving the external speech, the current dialogue field belonging to the field migration map.

In S202, the electronic device determines how many rounds have been completed for a dialogue which is in the current dialogue field.

In S203, if the number of rounds of a completed dialogue is less than the number of rounds of dialogue configured in the current dialogue field, the electronic device ignores the external speech.

In this embodiment, each dialogue field in the field migration diagram is configured with a number of rounds of dialogue according to the user's historical dialogue data (the number of rounds of dialogue means that the user usually conducts several rounds of dialogue in this dialogue field before jumping to other dialogue fields). Only when it is confirmed that the number of rounds of dialogue that have been conducted in the current dialogue field is less than the configured number of rounds of dialogue, indicating that it can be determined that the dialogue in the current dialogue field has not been completed according to the user's habits, the external speech is ignored.

In an exemplary embodiment, before judging whether the hit dialogue field belongs to one of the plurality of dialogue fields in the field migration map, the method further includes:

determining, by the electronic device, a corresponding semantic information confidence level based on the hit dialogue field; and jumping to the speech skill corresponding to the hit dialogue field if the semantic information confidence level is greater than a first set threshold.

In an exemplary embodiment, the hit dialogue field includes a plurality of dialogue fields, and the corresponding semantic information confidence level includes a plurality of semantic information confidence level values. The speech skill jumping method for man-machine dialogue further includes:

predicting, by the electronic device, a next field state based on a context state of the field migration map if a plurality of values in the plurality of semantic information confidence level values are greater than a second set threshold and equal to or less than the first set threshold; and jumping to a semantic skill corresponding to the next field state if a dialogue field corresponding to the next field state exists in a plurality of dialogue fields corresponding to the plurality of values;

otherwise, jumping to a semantic skill of a dialogue field corresponding to the maximum value among the plurality of values.

In an exemplary embodiment, the speech skill jumping method for man-machine dialogue further includes: determining, by the electronic device, whether the current dialogue scene is a high-frequency interaction scene if the maximum value among the plurality of semantic information confidence level values is equal to or less than the second set threshold. The dialogue context may be the current ongoing interaction field, and a migration path starting from awakening to the field state of the current field. If yes, the electronic device matches the speech skill corresponding to the external speech based on the field migration map corresponding to the high-frequency interaction scene.

In an exemplary embodiment, user interaction behaviors will be recorded by means of logs and a field migration map will be generated, and abnormal behaviors therein will be identified through algorithm classification. The abnormal data is corrected or deleted by manual annotation, and the field migration map is continuously updated through training.

Figure 4:
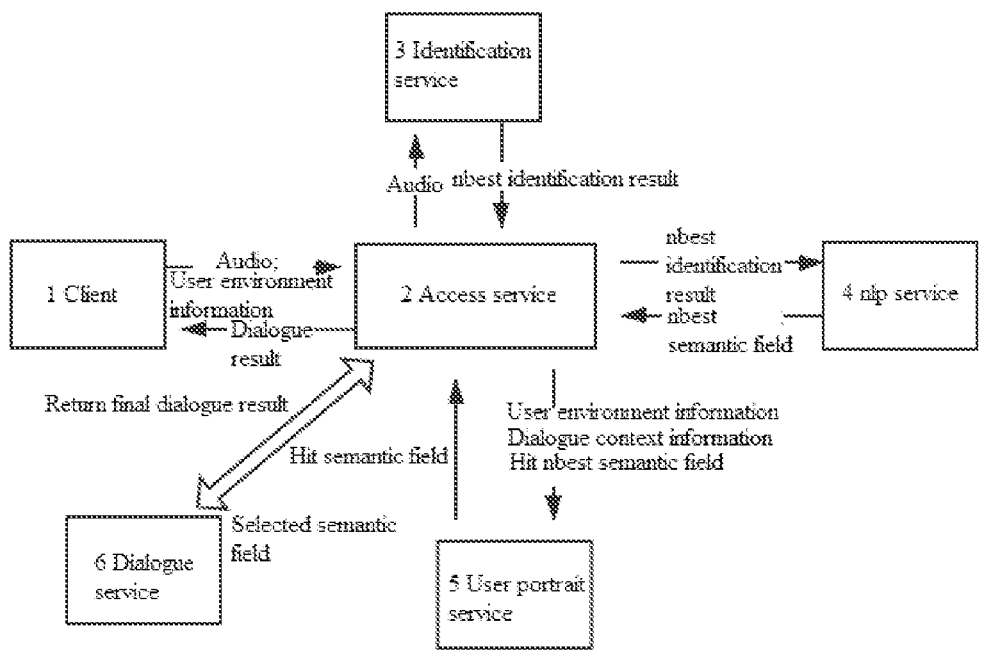
FIG. 4 is a schematic diagram of a dialogue system implementing the speech skill jumping method for man-machine dialogue according to an embodiment of the present invention.

FIG. 4 is a schematic diagram of a dialogue system implementing the speech skill jumping method for man-machine dialogue according to an embodiment of the present invention. The system includes:
- a client 1 configured to acquire user audio and user environment information;
- an access service unit 2 configured to schedule service resources;
- an identification service unit 3 configured to identify the audio and obtain an nbest identification result;
- an NLP service unit 4 configured to perform natural language processing on the nbest identification result to obtain an nbest semantic field;
- a user portrait service unit 5 configured to determine a hit skill based on the user environment information, dialogue context information and nbest semantic field; and
- a dialogue service unit 6 configured to serve the hit skill and return a final dialogue result corresponding to the user audio.

Figure 5:
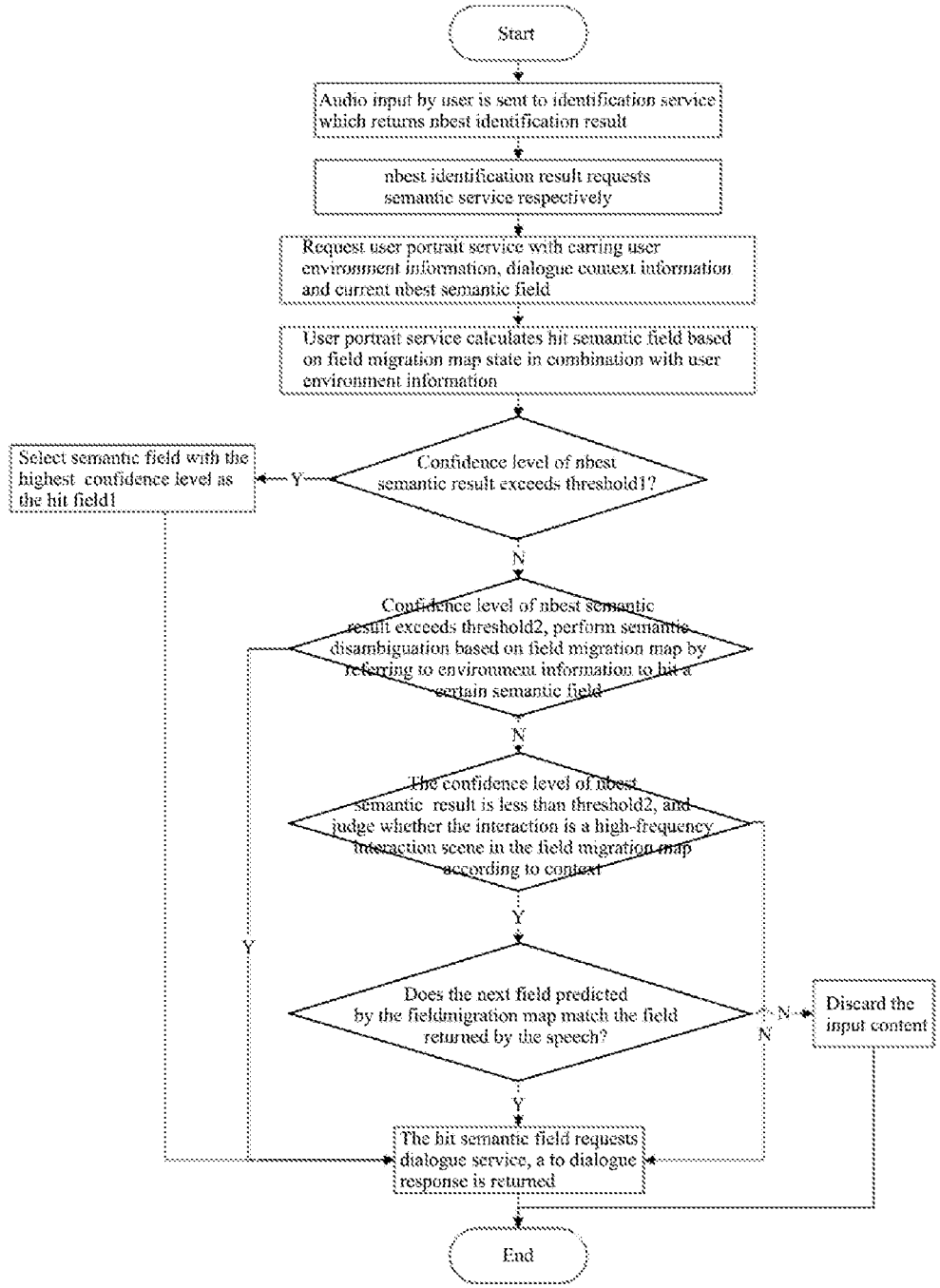
FIG. 5 is a flowchart of a speech skill jumping method for man-machine dialogue according to still another embodiment of the present invention.

FIG. 5 is a flowchart of a speech skill jumping method for man-machine dialogue according to still another embodiment of the present invention. This embodiment includes the following steps.

First, an audio input by a user is sent to an identification service (and uploaded to an access service with environment information), and the identification service returns an nbest identification result.

The nbest identification result requests a semantic service respectively to perform semantic analysis thereon, and process them based on the semantic information confidence level.

The user environment information, the dialogue context information and the current nbest semantic field are carried to request a user portrait service.

The user portrait service calculates a hit semantic field based on the state of the field migration map in combination with the user environment information.

Whether a confidence level is greater than threshold1 exists in the confidence levels of the nbest semantic result is determined. For example, the value range of threshold1 is [0.9, 1], and in this embodiment, the value of threshold1 is 0.9.

If yes, the semantic field with the highest confidence is selected as the hit field, the semantic information is considered accurate, and the dialogue service is directly requested and a response is returned.

If the confidence level of the nbest semantic result is less than threshold1 and greater than threshold2, and the nbest semantic result involves a plurality of fields and an ambiguity problem exists, then a next field state is predicted based on the context state of the field migration map. If it matches the semantic field in nbest, this field is selected and the dialogue service is requested. If no semantic service matches nbest, the semantic field is selected based on the priority of the nbest semantic confidence level. In an exemplary embodiment, the value range of threshold2 is [0.6, 0.9], and in this embodiment of the present invention, the value of threshold2 is 0.7.

If the confidence levels of the nbest semantic result are less than threshold2, the dialogue context of the interaction is found, and a high-frequency interaction path of the field migration map is matched. If the predicted result of the field migration map does not match the semantic result of the user input, the input is discarded, otherwise a dialogue response for that semantic is returned. If the interactive dialogue context is not a high-frequency interactive path, the semantic field is selected in the order of the priority of the nbest semantic confidence level by rule.

In the present invention, a field migration map is generated based on user interaction habits, and according to the nbest result of the identification results in the user interaction process, combined with information such as environment information and dialogue context, user intentions can be more effectively identified, improving the accuracy of field jumping. For obviously abnormal input content (such as noise), the noise input is shielded by combining the field switching state map, improving task completion and interaction efficiency.

It should be noted that the foregoing embodiments of method are described as a combination of a series of actions for the sake of brief description. Those skilled in the art could understand that the application is not restricted by the order of actions as described, because some steps may be carried out in other order or simultaneously in the present application. Further, it should also be understood by those skilled in the art that the embodiments described in the description are preferable, and hence some actions or modules involved therein are not essential to the present application. Particular emphasis is given for respective embodiment in descriptions, hence for those parts not described specifically in an embodiment reference can be made to other embodiments for relevant description.

In some embodiments, an embodiment of the present invention provides a non-volatile computer-readable storage medium storing one or more programs including execution instructions. The execution instructions can be read and executed by an electronic device (including but not limited to a computer, a server, or a network device, etc.), so as to execute any one of the above speech skill jumping methods for man-machine dialogue according to the present invention.

In some embodiments, an embodiment of the present invention further provides a computer program product, including a computer program stored in a non-volatile computer-readable storage medium. The program instructions in the computer program, when being executed by a computer, enable the computer to execute any of the above speech skill jumping method for man-machine dialogue.

In some embodiments, an embodiment of the present invention further provides an electronic device, including at least one processor and a memory communicatively coupled to the at least one processor. The memory stores instructions executable by the at least one processor to enable the at least one processor to perform the speech skill jumping method for man-machine dialogue.

In some embodiments, an embodiment of the present invention further provides a storage medium storing a computer program. The program, when being executed by a processor, perform the speech skill jumping method for man-machine dialogue.

Figure 6:
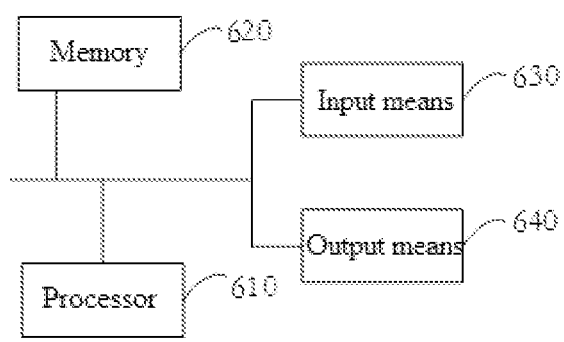
FIG. 6 is a schematic structural diagram of an electronic device according to an embodiment of the present invention.

FIG. 6 is a schematic diagram of a hardware structure of an electronic device for executing a speech skill jumping method for man-machine dialogue according to another embodiment of the present invention. As shown in FIG. 6, the device includes:
- one or more processors 610 and a memory 620, in which one processor 610 is taken as an example in FIG. 6.

The device for performing the speech skill jumping method for man-machine dialogue may further include: an input means 630 and an output means 640.

The processor 610, the memory 620, the input means 630, and the output means 640 may be connected by a bus or in other ways, and the connection by a bus is taken as an example in FIG. 6.

As a non-volatile computer-readable storage medium, the memory 620 may store non-volatile software programs, non-volatile computer-executable programs and modules, such as the program instruction/module corresponding to the speech skill jumping method for man-machine dialogue in the embodiments of the present invention. The processor 610 executes various functional applications and data processing of a server by running the non-volatile software programs, instructions and modules stored in the memory 620, that is, to realize the speech skill jumping method for man-machine dialogue in the above embodiments.

The memory 620 may include a stored program area and a stored data area. The stored program area may store an operating system, an application program required for at least one function. The stored data area may store data created according to the use of the speech skill jumping device for man-machine dialogue, and the like. Additionally, the memory 620 may include high speed random access memory and nonvolatile memory, such as at least one magnetic disk storage device, flash memory device, or other nonvolatile solid state storage device. In some embodiments, the memory 620 may include a memory located remotely relative to the processor 610 and connected to the speech skill jumping device for man-machine dialogue through a network. Examples of such networks include, but are not limited to, the Internet, an intranet, a local area network, a mobile communication network, and combinations thereof.

The input means 630 may receive input numerical or character information, and generate signals related to user settings and function control of the speech skill jumping device for man-machine dialogue. The output means 640 may include a display device such as a display screen.

The memory 620 stores one or more modules, which, when being executed by the one or more processors 610, perform the speech skill jumping method for man-machine dialogue in any of the above method embodiments.

The above product can execute the method provided by the embodiments of the present application, and has functional modules and beneficial effects corresponding to the execution of the method. For technical details not described specifically in the embodiments, reference may be made to the methods provided in the embodiments of the present application.

The electronic devices in the embodiments of the present application may be in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The embodiments of devices described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are merely intended to illustrate the technical solutions of the present invention, rather than limiting them. Although the present invention has been described in detail with reference to the foregoing embodiments, those skilled in the art should understand that the technical solutions described in the various embodiments can still be modified or some technical features thereof can be equivalently replaced. These modifications or substitutions do not make the essence of the corresponding technical solutions depart from the spirit and scope of the technical solutions of the embodiments of the present invention.

What is claimed is:

1. A speech skill jumping method for man-machine dialogue, applied to a dialogue system comprising a client and a server that communicates with the client, wherein the sever comprises an access service unit, an identification service unit, an NLP service unit, a user portrait service unit and a dialogue service unit, the client, the identification service unit, the NLP service unit, the user portrait service unit, and the dialogue service unit interact with each other through the access service unit, the method comprising:

constructing, by the user portrait service unit, a field migration map in advance based on a user's historical man-machine dialogue data, the field migration map being a directed map comprising a plurality of dialogue fields;

receiving, by the client, an external speech and sending the external speech to the identification service unit for speech recognition and obtaining a speech recognition result;

performing, by the NLP service unit, natural language processing on the speech recognition result to determine a dialogue field that the external speech hits; and judging, by the user portrait service unit, whether the hit dialogue field belongs to one of the plurality of dialogue fields in the field migration map, and ignoring the external speech if not, and jumping to a speech skill corresponding to the hit dialogue field if yes, and serving the hit dialogue field and returning a final dialogue result corresponding to the external speech by the dialogue service unit, wherein each of the plurality of dialogue fields in the field migration map is configured with a number of rounds of dialogue; and the method further comprises:

determining, by the user portrait service unit, a current dialogue field that provides services before receiving the external speech, the current dialogue field belonging to the field migration map;

determining, by the user portrait service unit, how many rounds of dialogue that have been completed under the current dialogue field; and ignoring the external speech if the number of rounds of dialogue completed is less than the configured number of rounds of dialogue in the current dialogue field.

2. The method according to claim 1, wherein before judging by the user portrait service unit whether the hit dialogue field belongs to one of the plurality of dialogue fields in the field migration map, the method further comprises:

determining, by the NLP service unit, a corresponding semantic information confidence level based on the hit dialogue field; and jumping to the speech skill corresponding to the hit dialogue field if the semantic information confidence level is greater than a first set threshold.

3. The method according to claim 2, wherein the hit dialogue field comprises a plurality of dialogue fields, and the corresponding semantic information confidence level comprises a first plurality of semantic information confidence level values; and the method further comprises:

predicting, by the user portrait service unit, a next field state based on a context state of the field migration map if a second plurality of semantic information confidence level values in the first plurality of semantic information confidence level values are greater than a second set threshold and equal to or less than the first set threshold;

jumping to a speech skill corresponding to the next field state if a dialogue field corresponding to the next field state exists in a plurality of dialogue fields corresponding to the second plurality of semantic information confidence level values;

otherwise, jumping to a speech skill of a dialogue field corresponding to the maximum value among the second plurality of semantic information confidence level values.

4. The method according to claim 3, further comprising:

determining, by the user portrait service unit, whether a current dialogue scene is a high-frequency interaction scene based on a dialogue context of the external speech if the maximum value among the plurality of semantic information confidence level values is equal to or less than the second set threshold; and if yes, matching, by the user portrait service unit, the speech skill corresponding to the external speech based on the field migration map corresponding to the high-frequency interaction scene.

5. The method according to claim 1, wherein the field migration map comprises a plurality of sub-field migration maps corresponding to a variety of different environment information; and the method further comprises:

acquiring, by the client, current environment information;

determining, by the user portrait service unit, a matched sub-field migration map based on the current environment information; and wherein judging, by the user portrait service unit, whether the hit dialogue field belongs to one of the plurality of dialogue fields in the field migration map comprises:

judging, by the user portrait service unit, whether the hit dialogue field belongs to one of a plurality of dialogue fields in the matched sub-field migration map.

6. The method according to claim 5, wherein the environment information comprises at least one of current time, current location, current scene and weather.

7. An electronic device comprising: at least one processor, and a memory communicatively coupled to the at least one processor, wherein the memory stores instructions executable by the at least one processor, the instructions being executed by the at least one processor to enable the at least one processor to perform the steps of the method of claim 1.

8. A non-transitory computer-readable storage medium in which a computer program is stored, wherein the computer program, when being executed by a processor, performs the steps of the method of claim 1.

* * * * *